United States Patent [19]

Krause

[11] Patent Number: 5,361,017

[45] Date of Patent: Nov. 1, 1994

[54] INSTRUMENT PANEL AND EL LAMP THEREOF

[75] Inventor: Daniel J. Krause, East Aurora, N.Y.

[73] Assignee: Astronics Corporation, Orchard Park, N.Y.

[21] Appl. No.: 12,016

[22] Filed: Feb. 1, 1993

[51] Int. Cl.[5] .................................... H05B 37/02
[52] U.S. Cl. ................................ 315/151; 315/307; 250/205
[58] Field of Search ............... 315/151, 158, 169.3, 315/307, 291; 250/205

[56] References Cited

U.S. PATENT DOCUMENTS

| | | | |
|---|---|---|---|
| 4,443,741 | 4/1984 | Tanaka et al. | 315/158 |
| 4,467,246 | 8/1984 | Tanaka et al. | 315/151 |
| 4,886,961 | 12/1989 | Kimura et al. | 250/205 |
| 5,075,596 | 12/1991 | Young et al. | 315/169.3 |
| 5,089,748 | 2/1992 | Ihms | 315/158 |

*Primary Examiner*—Richard A. Bertsch
*Assistant Examiner*—Peter Korytnyk
*Attorney, Agent, or Firm*—Shlesinger, Fitzsimmons & Shlesinger

[57] ABSTRACT

Each of a plurality of EL lamps in an instrument panel has its own control circuit for connecting the lamp to an adjustable AC voltage source. Each control circuit includes a photodetector for detecting the intensity of the illumination of its associated lamp, when the lamp is energized. With respect to a given input voltage of the AC voltage source, when the intensity of the light emitted by a given lamp begins to diminish, its control circuit will automatically increase the AC voltage applied across the electrodes of the lamp, thereby maintaining the light intensity of the lamp regardless of its age, for a given AC input voltage to the control circuit. The intensity of each lamp therefore remains consistent throughout substantially the full life of the EL lamp.

16 Claims, 2 Drawing Sheets

INSTRUMENT PANEL AND EL LAMP THEREOF

BACKGROUND OF THE INVENTION

This invention relates to an improved instrument panel and an electroluminescent (EL) lamp therefor, and more particularly to an improved EL lamp of the type which is particularly suited for use in aircraft instrument panels. Even more particularly, this invention relates to an improved EL lamp having self-regulating means for maintaining the intensity or brightness of the lamp for its entire life span.

Circa World War II, aircraft cockpits customarily were equipped with instrument panels made of plastic, and having embedded therein a plurality of miniature incandescent bulbs for illuminating transluscent nomenclature formed on the face of the instrument panel. In more recent years aircraft panels have incorporated therein EL lamp devices which provide extremely uniform light as opposed, for example, to hot spots of light which often were produced in the older, incandescent-type instrument panel. Aircraft panels utilizing EL lamp illumination in general have much improved useful operating lives as compared to the incandescent-type instrument panels. This application is primarily concerned with aircraft panels which have incorporated therein hover EL lamps or panels for illuminating the instrument panel nomenclature.

Before proceeding further, it should be noted that electroluminescent lamps are often manufactured in flat, panel configurations, and for that reason are often referred to as either EL lamps or EL panels. Since the hereinafter described products are particularly suited for incorporation into aircraft instrument panels and the like, they will normally be referred to as EL lamps to avoid confusion with the panels (instrument) in which they are embedded or otherwise incorporated. EL lamps of the type which heretofore have been incorporated in instrument panels and the like are disclosed in, for example, U.S. Pat. Nos. 4,578,617 and 4,619,624, which patents are assigned to the same assignee as is this application.

Aircraft instrument panels of the type described are generally supplied with an alternating current (AC), typically in the range of 115 volts at 400 hertz (Hz). Moreover, this voltage supply customarily is readily adjustable optionally to supply an AC voltage ranging anywhere from, for example, 20 to 115 volts so that the intensity of the light emitted by an associated EL lamp can be reduced simply by reducing its operating voltage. However, in connection with the EL lamps described herein, there is a minimum threshold voltage which must be exceeded (e.g., in excess of 30 or 40 volts) before the lamp will begin to emit light.

Although more efficient and longer lasting than the old incandescent-type aircraft panels, instrument panels using EL lamps have the disadvantage that the brightness or light intensity of the respective EL lamps in the panel tends to decrease over the life of the lamp, notwithstanding the fact that its operating voltage and frequency are held constant over the same period of time. For example, in some cases conventional EL lamps may be capable of only half their initial brightness after only 1500 hours of use. For this reason, this so-called "brightness decay" has often discouraged the use of EL lamps for backlighting. Moreover, since this loss of brightness often limits the useful life of instrument panels of the type described, it is often necessary to require periodic replacement of instrument panels or their EL lamps. The replacement, in turn, creates new problems, particularly in the case of aircraft instrument panels, because the new panels or replacement lamps often emit more brightness or light intensity at the same voltage than did the "old" panels or lamps which they replaced and as a consequence this often results in distracting differences between the various instrument panels in a cockpit.

In an effort to solve this problem aircraft panels have in the past been manufactured with a special light sensing mechanism comprising a single EL lamp mounted in an instrument panel to face rearwardly, as contrasted to the remaining EL lamps which face forwardly of the panel to illuminate various nomenclature thereon. The single rearwardly facing lamp directed its light onto a photodetector which was connected to a common power supply which applied the exiting voltage for all the EL lamps in the panel, including the rearwardly facing "control" lamp. The problem with this solution, however, was that the intensity of the one, "control" lamp was not truly indicative of the intensity of each of the remaining lamps in the panel which in fact glowed with different intensities, thus producing undesirable brightness differences, particularly at low brightness levels.

It is an object of this invention, therefore, to provide an improved instrument panel of the type described which is illuminted by EL lamps, and which has incorporated therein means for maintaining substantially uniform light intensity of its lamps throughout the useful lives of the lamps.

Still another object of this invention is to provide for instrument panels of the type described an improved EL lamp and associated self-regulating means which will function automatically to adjust the operating voltage of the lamp, therefore to maintain a uniform light intensity in the EL panel.

A further object of this invention is to provide in improved EL lamp having a novel voltage control circuit therefor which will significantly prolong the useful life of the lamp, and which at the same time can be adjusted to maintain its light intensity at a predetermined value.

Still other objects of this invention will be apparent hereinafter from the specification and from the recital of the appended claims, particularly when read in conjunction with the accompanying drawings.

SUMMARY OF THE INVENTION

EL lamps and control circuits therefor are potted or otherwise encapsulated in a plastic, translucent jacket containing instruments designed to be illuminated by the lamps. The control circuit of each lamp includes a photodetector, such as a phototransistor, the light-sensitive area of which registers through an opening in the lamp with a reflector which is secured to the face of the lamp to reflect light therefrom through the opening and onto the light-sensitive area of the photodetector. The control circuit includes an amplifier one input of which receives a signal proportionate to the input voltage which is applied to the circuit from an AC power source that is adjustable in a range of approximately 20–115 volts. The other input to the amplifier receives a signal proportionate to the current flow through the photodetector. The amplifier compares these two input signals and produces at its output a signal which is high if the lamp is too bright, and is low if the lamp output is too dim.

The amplifier output is used to control current flow in an N channel field effect transistor, which is connected in circuit with the EL lamp power supply by a diode rectifier. The output of the amplifier is optically coupled to the transistor circuit in such manner that as the amplifier output diminishes the current flow through the transistor increases, thus increasing the light intensity of the EL lamp, and vice versa.

THE DRAWINGS

DETAILED DESCRIPTION OF THE PREFERRED EMBODIMENTS

Figure 1:
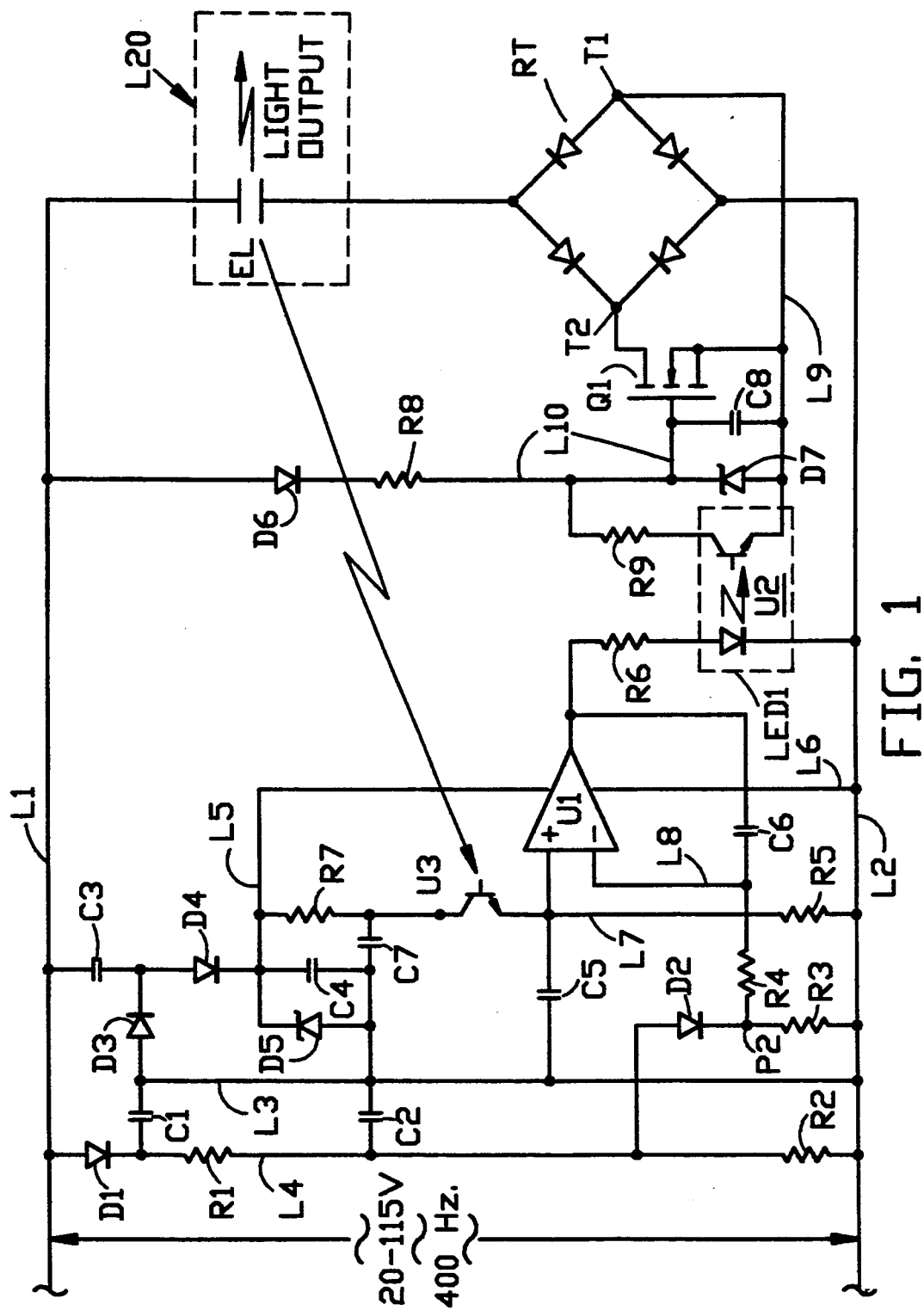
FIG. 1 is a wiring diagram illustrating schematically an EL lamp and a voltage control circuit therefor made according to one embodiment of this invention.

Referring now to FIG. 1 by numerals of reference, 20 denotes generally and diagramatically an EL lamp which is adapted to be incorporated in an instrument panel of the type described in greater detail hereinafter. Lamp 20 is connected at one side to a power line L1, and at its opposite side through a conventional diode bridge rectifier RT with the other line L2 of the power supply. Lines L1 and L2 are adapted to be connected across a conventional 400 Hz. AC power supply of the type which normally is employed in aircraft which utilize instrument panels that are illuminated by EL lamps. As shown in FIG. 1, this AC power supply is adjustable by conventional means, not illustrated, to supply anywhere from approximately 20 to 115 volts. As noted above, the intensity of the light or illumination provided by the EL lamp 20 will vary depending upon the voltage applied thereacross. As the supply voltage increases the intensity will increase; and conversely, as the supply voltage diminishes the intensity of the light emitted by lamp 20 will diminish.

Connected in series with each other between lines L1 and L2, and in parallel with the lamp 20 and bridge rectifier RT, are a diode D1, and resistors R1 and R2. Diode D1 has its anode connected to line L2, and its cathode connected to resistor R1 and to one side of a capacitor C1, the opposite side of which is connected by a line L3 to line L2. A second capacitor C2 is connected in parallel to capacitor C1 between line L3 and a line L4 connecting resistors R1 and R2. Line L4 is also connected through a second diode D2 and a resistor R3 to line 2, whereby there is developed between the diode D2 and the resistor R3, for example at point P2, an offset voltage which is designed to set the minimum threshold voltage necessary for turning on or otherwise causing the EL lamp 20 to emit light.

Also as shown in FIG. 1, the anode of another diode D3 is connected both to line L3 and to one side or the capacitor C1, and has its cathode connected through another capacitor C3 to line L1, and to the anode of a diode D4, the cathode of which is connected to a line L5. Line L5 is connected to one of the power supply terminals of a conventional, high gain operational amplifier U1, the other power supply terminal which is connected by another line L6 to line L2. Also connected in parallel between lines L3 and L5 are a Zener diode D5, a capacitor C4, and a series connected capacitor C7 and resistor R7. The juncture between capacitor C7 and the resistor R7 is connected through the collector-emitter circuit of a phototransistor U3 (hereinafter referred to also as a photodetector) and a line L7 and resistor R5 to line L2. As shown schematically by the arrow in FIG. 1, and as described in greater detail hereinafter, the photodetector U3 is positioned adjacent to EL lamp 20 to be illuminated thereby, and operatively to sense the intensity of the light emitted by lamp 20. Line L7 is also connected through a capacitor C5 to line L3, and to the positive input terminal of the amplifier U1, so that this particular terminal of the amplifier is connected both to the capacitor C5 and the photodetector U3. The other, negative input terminal of the amplifier U1 is connected by a lime L8 through a resistor R4 to the point P2 between the diode D2 and the resistor R3, and is also connected through a capacitor C6 with the output of amplifier U1.

The output of amplifier U1 is also applied through a resistor R6 to the anode of a light emitting diode LED1, the cathode of which is connected to line L2. The LED1 forms part of a conventional optical isolator U2, having a phototransistor the emitter of which is connected by a line L9 to terminal T1 of the rectifier RT, and the collector of which is connected through a resistor R9, a line L10, a resistor R8, and a diode D6 with line L1. Diode D6 has its anode connected to line L1, and its cathode connected to one side of resistor R8, the opposite side of which is connected by line L10 to the cathode of a Zener diode D7, the anode of which is connected to line L9. Diode D7 and a capacitor C8 are connected in parallel with each other between lines L9 and L10; and line L10 is also connected to the base of an N channel field effect transistor Q1, which may be of the metal oxide semiconductor variety. The emitter of Q1 is connected to line L9, while its collector is connected to terminal T2 of the rectifier RT.

Figure 2:
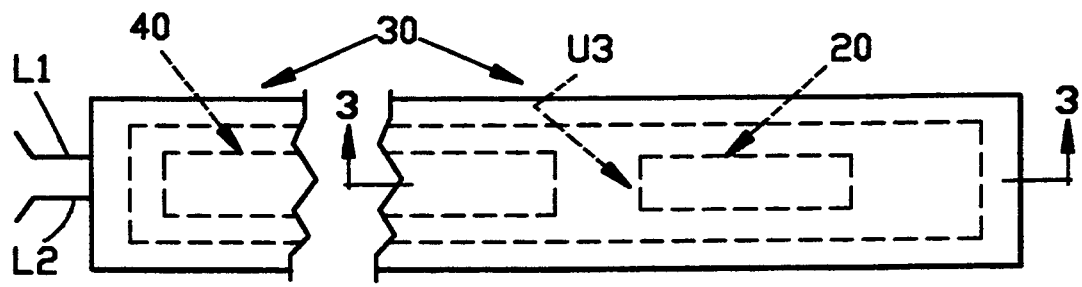
FIG. 2 is a fragmentary plan view of an instrument panel incorporating therein EL lamps and control circuits therefor of the type shown in FIG. 1.
Figure 3:
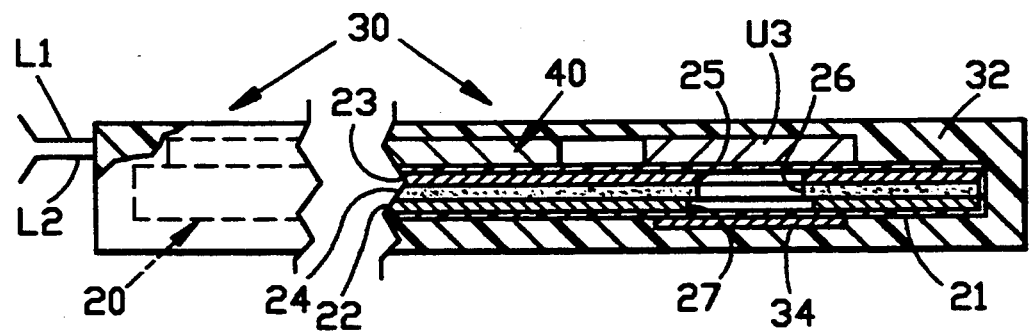
FIG. 3 is a fragmentary front elevational view of this panel with a portion of its EL lamps and control circuit therefor shown in section taken along the line 3—3 in FIG. 2 looking in the direction of the arrows.

Referring now to FIGS. 2 and 3, numeral 30 denotes generally an instrument panel having incorporated therein EL lamps such as denoted at 20 in FIG. 1, each such lamp including its photodetector U3 and a printed circuit board 40 which contains the remainder of its voltage control circuit as shown in FIG. 1. While panel 30 is described in detail hereinafter in connection with only one such lamp 20 and its control circuit, it will be understood that panel 30 contains several such lamps and their associated control circuits.

In the embodiment illustrated, and by way of example, each lamp 20 is manufactured in a manner known in the industry as a sandwich or foil lamp. As shown in FIG. 3 it comprises a transparent, plastic jacket 21 made or ACLAR, or the like, and containing a pair of spaced, planar electrodes 22 and 23, that are separated by an intervening layer 24 of electroluminescent phosphor material that is suspended in a dielectric matrix. (In FIG. 3 the relative sizes of the elements have been exaggerated for purposes of illustration.) The front electrode 22 is made from a light-transmitting, electrically conductive material of conventional design, while the back electrode 23 is made from a reflective, non-light transmitting material, such as aluminum foil. Thus, when each lamp 20 is energized, light therefrom will be reflected forwardly by its electrode 23 (downwardly in FIG. 3) and through the light-transmitting layer 22 and transparent jacket 21.

The photodetector U3 and the printed circuit board 40 are secured by adhesive to the rear face of the back electrode 23 in spaced, adjacent relation to each other; and U3 is wired to the printed circuit in the manner shown in FIG. 1. Finally, the photodetector U3, the board 40 and the attached EL lamp 20 are encapsulated by potting or the like within a translucent jacket 32 which may be made, for example, from an epoxy resin. Voltage supply lines L1 and L2 of the control circuit may extend to the exterior of panel 30 for connection to an AC power supply such as the type described above in connection with FIG. 1. Since they form no part of this invention, the exact nomenclature which is incorporated in panel 30 has not been illustrated. However it will be apparent to one skilled in the art that such nomenclature may be incorporated in panel 30 for illumination in known manner by lamp 20.

Referring again to in FIG. 3, it will be noted that the photodetector U3, and more particularly its light sensitive area, is positioned so that it registers with like openings 25 and 26 which are formed, respectively, in the rear electrode 23 and phosphor layer 24 of the lamp 20. Moreover, these openings in turn register with a slightly larger opening 27 in the front electrode 22, and with a thin light reflector or diffuser element 34, which is secured over opening 27 between the face of lamp 20 at the inside surface of the jacket 32. By way of example, the reflector or diffuser element 34 may be made from a white matte calendared vinyl, so that when the lamp 20 is energized (illuminated), light from the lamp is reflected rearwardly by element 34, through the openings 25–27 in the lamp layers 22–24, and directly onto the light sensitive area of the photodetector U3. In this way the detector U3 is positioned at all times to sense the intensity of the light emitted by lamp 20 when the latter is energized. Instead of using a phototransistor, the light sensor U3 may be a photodetector of the type known as an Allegro/Sprague ULN-3311. Also opening 27 is made slightly larger than openings 25 and 26 to preclude any electric short circuits, and to enhance the reflection of light rearwardly through openings 25–27.

In use, and assuming that panel 30 is an aircraft panel of the type described above, and someone in the aircraft is free to adjust the input voltage between lines L1 and L2 anywhere from approximately 20 to 115 volts AC, each amplifier U1 will be utilized, as noted hereinafter, continuously to monitor the output of its associated EL 20, and the input voltage supplied between lines L1 and L2. As the input voltage is increased or decreased by an operator in the aircraft, the output of the amplifier will be utilized automatically to adjust the voltage that is applied to the EL lamp, and therefore automatically to maintain the desired (required) brightness of the lamp.

More specifically, diode D1 rectifies a sample of the AC input voltage, thus producing a DC current which charges capacitors C1 and C2. The input voltage in turn is divided by resistors R1 and R2 to produce on line L4 a reduced DC voltage level which, of course, will vary in accordance with the AC input voltage between lines L1 and L2. Diode D2 resistor R3 are selected so that diode D2 remains non-conductive until the voltage on line L4 reaches a predetermined threshold value, at which time diode D2 conducts and produces at P2 a voltage which will thereafter increase as the voltage on line L4 increases above its threshold value. This threshold value is the voltage necessary to turn the lamp 20 "on", or in other words to cause it to produce a desired minimum intensity of light.

During the negative portion of the AC input voltage between lines L1 and L2, a charge is placed on capacitor C3 by diode D3. During the positive portion of the AC input signal, this charge is transferred via diode D4 to capacitor C4 where it is accumulated and filtered. The Zenner diode D5 limits the charge which can be accumulated on capacitor C4, and also provides power, via line L5 to one power supply terminal of the amplifier U1, the other terminal of which is connected by line L6 to line L2. The voltage on line L5 is also filtered through resistor R7 and capacitor C7 and is applied to the collector of the photodetector U3. As noted above, U3 senses the intensity of the light output of the EL lamp 20, and for that purpose is selected to produce current flow through its collector-emitter circuit in proportion to the intensity of the light emitted by lamp 20. Also, since the amplifier U1 is designed to monitor any change in the intensity of light emitted by lamp 20, the value of resistor R5 is selected so that it in effect acts as a current to voltage converter to help maintain on capacitor C5 the charge which is generated by the current flowing through the photodetector U3. This voltage in turn is applied to one of the inputs of the amplifier U1. The voltage existing at point P2 is applied through the resistor R4 and line L8 to the other input of amplifier U1. Amplifier U1 then compares the difference between the required brightness of lamp 20, as represented by the voltage existing at point P2, and the actual brightness of the lamp as represented by the voltage developed on line L7. As a consequence, the output voltage of amplifier U1 is high if the lamp is too bright, is low if the lamp is too dim, and is at an intermediate level when the lamp is at the proper brightness level. Moreover, the response time of the amplifier is modified by the capacitor C6 and resistor R4 to stabilize the sensing operation.

The voltage which is actually applied across the EL lamp 20 is controlled by the transistor Q1, which normally is operated in a non-switching, partially conducting mode. Since Q1 is a direct current device, terminals T1 and T2 are alternately switched to the EL lamp 20 and to the AC return line L2 by the rectifier RT. The level of conduction of Q1 is controlled by the voltage differential between lines L9 and L10. This voltage is obtained from the charge on capacitor C8, which is charged each positive half cycle of the AC input signal by diode D6 and resistor R8. The maximum charge on capacitor C8 is limited by the Zenner diode D7. A maximum charge on capacitor C8 will drive transistor Q1 into a maximum conduction state, thereby turning the EL lamp 20 fully on, but at a level dependent upon the input voltage applied between lines L1 and L2.

To reduce the charge on capacitor C8, and thereby to reduce the conduction of Q1, and the consequent light output of lamp 20, the output of amplifier U1 is applied through the resistor R6 and the LED1 of the optocoupler U2 to line L2. The light which is generated by the current flow through LED1 creates current flow through the phototransistor section of the optocoupler U2, thus shunting therethrough line L10 to line L9, and thereby discharging the capacitor C8 through the limiting resistor R9. As capacitor C8 discharges, the current flow through transistor Q1 will diminish, thus producing a corresponding reduction in the intensity of the light emitted by lamp EL 20. Conversely, of course, as the output of amplifier U1 diminishes, the light output of lamp 20 will increase. In this manner, the intensity of lamp 20 is controlled in response both to the amount of the input voltage between lines L1 and L2, and to the intensity of the light output from lamp 20. Thus, even though the applied voltage between lines L1 and L2 may remain constant, if in fact the intensity of the light generated by lamp 20 nevertheless decreases, current flow through the photodetector U3 will diminish, thus reducing the output of amplifier U1. Consequently, the charge on capacitor C8 will tend to remain high, therefore increasing current flow through Q1, and thereby increasing the voltage applied to lamp 20 in order to increase the intensity of its light output. Thus, even as the lamp 20 ages over a prolonged period of use, its output (light intensity) will remain constant for a given AC input voltage to the control circuit.

From the foregoing it will be apparent that the present invention provides a relatively simple and extremely compact and reliable means for significantly prolonging the useful life of an EL lamp, and in particular lamps of the type which are utilized in aircraft instrument panels and the like. By monitoring the light output of the lamp, is well as the input voltage to its control circuit, it is possible to maintain the light output of the lamp at a predetermined intensity for a given input voltage over a prolonged period of use. By using the self-regulating control circuit disclosed herein, it is possible to maintain uniform light intensity of an EL lamp throughout its operating life, and in so doing it is possible, as compared to prior such EL lamps, substantially to eliminate the "brightness decay" which was inherent in such prior lamps. In the case of instrument panels, each of its EL lamps can be maintained at a desired brightness, thereby eliminating distracting "bright" spots, and also permitting rapid detection and replacement of individual lamps upon failure thereof, rather than replacing the entire panel.

While this novel EL lamp and control circuit therefor has been illustrated and described as being particularly suited for use in connection with an instrument panel, it will be apparent that the lamp and its control circuit can be used in many other environments or combinations without departing from this invention. Moreover, it will be apparent that it is capable of still further modification, and that this application is intended to cover any such modifications as may fall within the scope of one skilled in the art, or the appended claims.

I claim:

1. In an instrument panel having a light transmissive shell, and a plurality of EL lamps mounted in said shell to illuminate nomenclature printed on the face of said shell, the improvement comprising:
    a plurality of separate controls circuits, each of said circuits connecting a respective one of said EL lamps to an adjustable AC voltage source to be energized thereby,
    means in each of said circuits for sensing the intensity of the illumination of its associated EL lamp, when said lamp is connected by its associated control circuit to said AC voltage source,
    voltage adjusting means in each of said circuits responsive to said sensing means therein automatically to increase the AC voltage applied by the circuit across the EL lamp associated with that particular circuit, when the intensity of the light emitted by the last-named lamp falls below a predetermined value,
    means in each of said circuits for producing a first signal representative of the value of the AC voltage applied by said voltage source to each of said circuits,
    said sensing means including means in each of said circuits for producing a second signal which varies relative to said first signal in proportion to the variation in the intensity of the illumination emitted by the EL lamp associated with the circuit, and
    said voltage adjusting means including means responsive to said variation of said second signal to effect a change in the voltage applied across a respective EL lamp by its associated control circuit.

2. The instrument panel as defined in claim 1, wherein the last-named means is operative to increase the AC voltage across said respective EL lamp as the value of said second signal falls relative to the value of said first signal, and vice versa.

3. In an instrument panel having a light transmissive shell, and a plurality of EL lamps mounted in said shell to illuminate nomenclature printed on the face of said shell, the improvement comprising
    a plurality of separate control circuits, each of said circuits connecting a respective one of said EL lamps to an adjustable AC voltage source to be energized thereby,
    means in each of said circuits for sensing the intensity of the illumination of its associated EL lamp, when said lamp is connected by its associated control circuit to said AC voltage source,
    voltage adjusting means in each of said circuits responsive to said sensing means therein automatically to increase the AC voltage applied by the circuit across the EL lamp associated with that particular circuit, when the intensity of the light emitted by the last-named lamp falls below a predetermined value, and to decrease the voltage across said last-named lamp when the intensity of its illumination exceeds said predetermined value,
    said sensing means comprising a plurality of light sensitive elements, each of said elements being connected in one of said control circuits to sense the illumination of its associated EL lamp,
    each of said light sensitive elements of each of said circuits being positioned to have illumination from its associated EL lamp directed onto a light sensitive surface of said element, and
    each of said EL lamps being mounted in said panel to direct the major portion of its illumination onto said face of said shell, and a minor portion of its illumination onto said light sensitive surface of its associated light sensitive element.

4. The instrument panel as defined in claim 3, including
    a plurality of reflective surfaces mounted on said panel to register with said light sensitive elements, and
    each of said reflective surfaces being operative to reflect said minor portion of illumination of a respective EL lamp onto the light sensitive surface of the registering light sensitive element.

5. In an instrument panel having a light transmissive shell with nomenclature printed on the face thereof,
    an EL lamp mounted on said shell rearwardly of said face thereof and operative, when illuminated, to direct its light toward said face of said shell to illuminate said nomenclature,
    a control circuit on said shell for connecting said EL lamp to an AC voltage source to be energized thereby, said control circuit including light sensing means positioned to sense the intensity of the light emitted by said lamp when said lamp is energized, and means in said circuit connected to said light sensing means and operative, when said lamp is connected by said control circuit to said voltage source, to increase the AC voltage across said lamp when the intensity of said light falls below a predetermined value, and to decrease the AC voltage across said lamp when the intensity of said light rises above said predetermined value.

6. The instrument panel as defined in claim 5, wherein said control circuit includes;

means for connecting said EL lamp to an adjustable AC voltage supply, and means operative automatically to adjust said predetermined value of said light intensity upwardly as the AC voltage supplied by said source is increased, and to lower said predetermined value of said light intensity as said voltage supplied by said source is decreased.

7. The instrument panel as defined in claim 5, wherein said light sensing means comprises a sensing element secured to said EL lamp and having thereon a light sensitive surface, and reflective means secured to said lamp to register with a portion of the light emitted by said lamp, and operative to reflect said portion of said light onto the light sensitive surface of said sensing element.

8. An EL lamp, comprising a transparent plastic jacket, a pair of spaced electrodes sealingly secured in said jacket and having an electroluminescent material operatively interposed between said electrodes, one of said electrodes being light transmissive and the other of said electrodes being light reflective, and a control circuit secured to said jacket for connection to an adjustable AC voltage source, and operable to apply voltage therefrom across said electrodes to cause said electroluminescent material to glow, whereby light emitted by said material is reflected by said other electrode forwardly through said one electrode, said circuit including light sensing means positioned to sense the intensity of the light emitted by said material, and voltage control means in said circuit responsive to the intensity of the light detected by said sensing means to increase the voltage across said electrodes when said light intensity decreases below a predetermine value.

9. The EL lamp as defined in claim 8 including means in said circuit responsive to a change in the value of the voltage applied by said AC voltage source to effect a proportionate change in said predetermined value of said light intensity.

10. The EL lamp as defined in claim 8, wherein said other electrode has an opening therethrough, and said one electrode has reflective means thereon registering with one end of said opening and operative to reflect a portion of the light from said material rearwardly through said opening, and said light sensing means registers with the opposite end of said opening in said other electrode to sense the intensity of the light reflected rearwardly through said opening.

11. The EL lamp as defined in claim 10, wherein said electrodes are generally planar and have a layer of said electroluminescent material disposed between spaced, confronting surfaces of said electrodes, each of said layer of electroluminescent material and said one electrode has therethrough an opening registering with said opening in said other electrode, and said reflective means comprises a layer of reflective material positioned over said opening in said one electrode and overlying marginal portions only of said one electrode around said opening therein.

12. The combination as defined in claim 11, wherein the opening in said one electrode is slightly larger than the opening in said other electrode.

13. The EL lamp as defined in claim 8, wherein said sensing means includes a light sensitive element having thereon a light sensitive surface, and means for directing a portion of the light emitted by said lamp onto said light sensitive surface of said element.

14. The EL lamp as defined in claim 8, wherein said sensing means includes means for producing a first electrical signal which increases in value as the intensity of said light increases, and vice versa, and said voltage control means includes means responsive to said first electrical signal to decrease the voltage across said electrodes as the value of said first signal increases, and to increase the voltage across said electrodes as the value of said first signal decreases.

15. The EL lamp as defined in claim 14, wherein said circuit further includes means for producing a second electrical signal representative of the value of the AC voltage applied by said voltage source, and means for comparing said first and second signals and for producing a third signal which increases in value as the intensity of light emitted by said lamp increases, and vice versa.

16. The EL lamp as defined in claim 15, including means responsive to said third signal to decrease the voltage across said electrodes as said third signal increases in value, and vice versa.

* * * * *